Oct. 16, 1928.  
A. B. REYNDERS  
1,687,637  
ELECTRICAL CENTERING DEVICE  
Filed Nov. 10, 1922

WITNESSES:

INVENTOR  
Arthur B. Reynders.  
BY  
ATTORNEY

Patented Oct. 16, 1928.

1,687,637

UNITED STATES PATENT OFFICE.

ARTHUR B. REYNDERS, OF SPRINGFIELD, MASSACHUSETTS, ASSIGNOR TO WESTINGHOUSE ELECTRIC & MANUFACTURING COMPANY, A CORPORATION OF PENNSYLVANIA.

ELECTRICAL CENTERING DEVICE.

Application filed November 10, 1922. Serial No. 600,149.

My invention relates to testing devices, more particularly to means for, and methods of, centering the elements of dynamo-electric machines, such as small A. C. motors.

During the operation of assembling the stator laminations for machines of the above-designated type and grinding them, the ends of the laminations may become distorted to such degree as to effect a displacement of the electrical center of the stator with relation to the mechanical center of the machine, whereas it is necessary, in order to prevent end-thrust by movement of the rotor under the influence of the magnetic field of the stator, that the two centers shall coincide.

It is among the objects of this invention to provide a device and a method of utilization of the same which shall, effectively and in a simple manner, ensure the centering of the stator relative to its frame so that the electrical and mechanical centers of the motor coincide.

It is another object of this invention to provide a device of the designated character which shall be simple in construction, free from moving parts and easy to operate and the use of which shall not require the services of a skilled operator.

In practising my invention, I provide a base and associate therewith a plurality of sets of coils with means for centering an electric element, such as a stator, with respect to a mechanical element, such as its frame. The base is so constructed that a stator frame may be placed thereon and said sets of coils be so arranged within the frame that they are symmetrically placed with respect to its center line. All the coils of the sets are also so arranged that they are symmetrically disposed with relation to the axis of the frame. The two sets of coils are connected to a suitable electrical measuring instrument, such as a differential meter, in which two coils are differentially connected to the sets of coils of the testing device and influence a pointer reading on a scale, constituting part of the meter.

Figure 1:
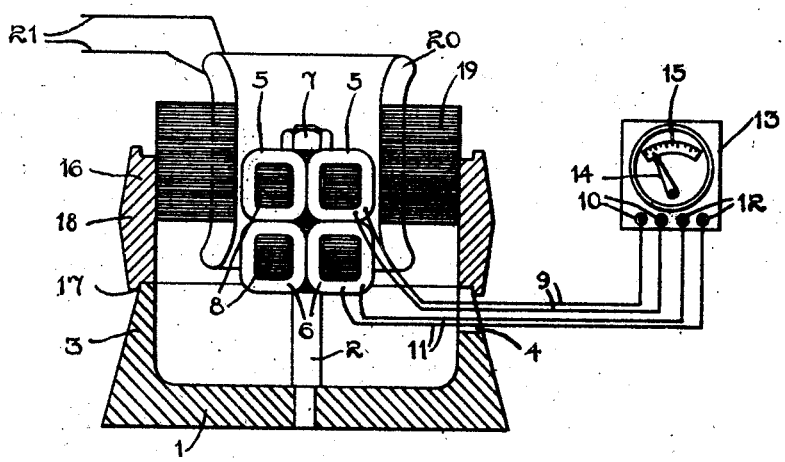
Figure 2:
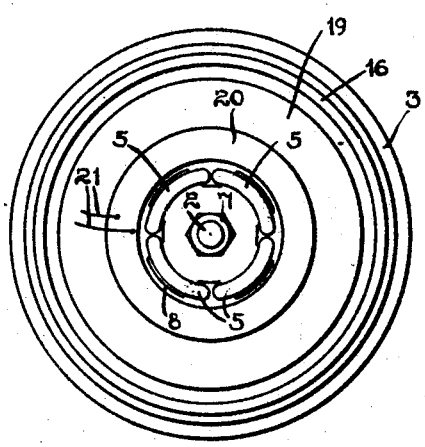

In the accompanying drawings constituting a part hereof and in which like reference characters designate like parts, Fig. 1 is a vertical cross-sectional view of my device, some parts being shown in elevation, and Fig. 2 is a plan view thereof.

I provide a base 1 having a spindle 2 centrally located thereon and an annular flange 3 having an opening 4 therein. Two sets of coils 5 and 6, each set consisting of any suitable number of series coils equivalent to the number of poles in the dynamo-electric machine and here shown as four in number, are secured to the spindle 2 by any suitable means, such as nut 7. If desired, the coils may be provided with laminated cores 8.

Leads 9 from the coils 5, which are connected in series, extend through opening 4 and are secured to terminals 10 that are electrically connected to one of the differential coils of the meter 13. A set of leads 11 connects series coils 6 to the terminals 12 of the other of the differential coils of the meter, the meter coils being so disposed and circuit-connected as to cause the pointer 14 to move over the scale 15.

The device may be utilized in centering stators with respect to the frames of dynamo-electric machines as follows. A frame 16 is placed upon the rim 17 of flange 3 so that its central, horizontal plane 18 coincides with the plane that separates the coils 5 from the coils 6, the two sets of coils being symmetrically disposed with respect to the plane 18. A stator core 19, having coils 20, is connected, by suitable leads 21, to a source of alternating current, such as, for example, a 60-volt, 60-cycle circuit. The vertical diameter of each of the coils 5 and 6 is approximately one-half the thickness of the core 19.

I connect the coils 20 of the stator to the source of alternating current and then press the core 19 into the frame 16, noting the reading of the pointer 14 on the scale 15. In the position shown in Fig. 1, the stator is pressed in only part way and, therefore, the magnetic effect thereof on coils 5 is greater than that on coils 6, thus causing the meter to move the pointer 14 to move toward the left-hand end of the scale 15. As the stator is pressed into the frame still farther, the magnetic effect of the stator upon the coil 6 becomes more nearly equal to that upon the coil 5, and the pointer 14 gradually approaches the middle point of the scale 15. When the electrical center of the stator coincides with the mechanical center or plane 18 of the frame, the coils 5 and 6 are equally affected by the stator and, therefore, the meter reading is zero. If the stator is pressed in too far, the pointer 14 will move correspondingly to the right of the zero point.

I have found that this device ensures the accurate centering of stators relative to their frames by inexperienced operators with a minimum of time and effort. The method involved is extremely simple and no difficulty is experienced in accurately centering the parts, provided the meter is sufficiently sensitive. I have found that a meter reading accurately to one-half volt is sufficiently sensitive for my purpose. My invention is not limited to the centering of stators in the frames but may be adapted to a variety of uses that will suggest themselves to those skilled in the art.

I claim as my invention:

1. In combination, in a device for relatively longitudinally centering two annular members to be telescopically related, indicating means and actuating means for said indicating means comprising a pair of elements, one of said members to be positioned with its radial center coinciding with a center between said elements, said elements being differentially related and to be inductively affected by the other member during the centering thereof to actuate said indicating means in accordance with the relative positions of said members.

2. In combination, in a device for centering the stator relative to the frame of a dynamo-electric machine, indicating means and actuating means for said indicating means comprising a pair of elements, said frame to be positioned with its center coinciding with a center between said elements, said elements being differentially related and to be inductively affected by the stator during the placing of the latter in the frame to actuate said indicating means in accordance with the relative positions of the frame and stator.

3. In combination, in a device for centering the stator relative to the frame of a dynamo-electric machine, indicating means, a base member for supporting the frame, and actuating means for said indicating means comprising a pair of differentially-related coil elements supported by the base member with a center line between the coils coinciding with the center line of the frame in the base member, the coils to be inductively affected during the introduction of the stator into the frame to actuate the indicating device in accordance with the relative positions of the frame and stator.

4. In combination, in a device for centering the stator relative to the frame of a dynamo-electric machine, indicating means, a base member for supporting the frame, and actuating means for said indicating means comprising a pair of differentially-related coil elements each including a number of series-related coils corresponding to the number of poles of the dynamo-electric machine, said elements being supported by said base member with a center line therebetween coinciding with the radial center of the frame and to be inductively affected during the introduction of the stator into the frame, while the latter is energized, to actuate the indicating device in accordance with the relative positions of the frame and stator.

In testimony whereof, I have hereunto subscribed my name this 2nd day of November, 1922.

ARTHUR B. REYNDERS.